United States Patent
Toyoda et al.

(10) Patent No.: US 7,264,910 B2
(45) Date of Patent: Sep. 4, 2007

(54) CYAN TONER AND METHOD OF PRODUCING CYAN TONER

(75) Inventors: Takayuki Toyoda, Yokohama (JP); Yasuaki Murai, Kawasaki (JP); Masayoshi Kato, Tokyo (JP); Norikazu Fujimoto, Susono (JP); Takeshi Miyazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/433,690

(22) Filed: May 15, 2006

(65) Prior Publication Data
US 2006/0234149 A1    Oct. 19, 2006

Related U.S. Application Data

(63) Continuation of application No. PCT/JP06/302907, filed on Feb. 14, 2006.

(30) Foreign Application Priority Data
Feb. 15, 2005    (JP)    ............... 2005-037049

(51) Int. Cl.
*G03G 9/09*    (2006.01)
(52) U.S. Cl. .................................. 430/108.21
(58) Field of Classification Search ........... 430/108.21, 430/108.5
See application file for complete search history.

(56) References Cited

U.S. PATENT DOCUMENTS

| | | | | |
|---|---|---|---|---|
| 3,535,347 A | * | 10/1970 | Bitterli ........................ | 552/109 |
| 4,135,927 A | * | 1/1979 | Draugelis et al. ............. | 430/44 |
| 5,714,542 A | * | 2/1998 | Niinae et al. ................ | 525/108 |
| 6,025,105 A | * | 2/2000 | Rice et al. ............. | 430/108.23 |
| 6,391,507 B1 | * | 5/2002 | Macholdt et al. ...... | 430/108.24 |
| 7,094,812 B2 | | 8/2006 | Banning et al. ............ | 523/160 |
| 2004/0214918 A1 | | 10/2004 | Banning et al. ............ | 523/160 |

FOREIGN PATENT DOCUMENTS

WO    WO 2004/10188 A1 * 11/2004

OTHER PUBLICATIONS

WO 2004/101688 A1, abstract (pub. Nov. 2004).*
Esp@cenet description view of WO 2004/101688 A1 (pub. Nov. 2004).*
Patent Abstracts of Japan for JPP 2004/323844, Nov. 2004.
Patent Abstracts of Japan for JPP 2005/002328, Jan. 2005.
Patent Abstracts of Japan for JPP 2004/184720, Jul. 2004.
Machine Translation of JPP 2004-184720 (pub. Jul. 2004).

* cited by examiner

*Primary Examiner*—Janis L. Dote
(74) *Attorney, Agent, or Firm*—Fitzpatrick, Cella, Harper & Scinto

(57) ABSTRACT

A cyan toner is provided which is brighter and more greenish in hue than conventional cyan toners and highly translucency. A cyan toner characterized by comprising toner particles at least having a coloring compound represented by the Formula (1):

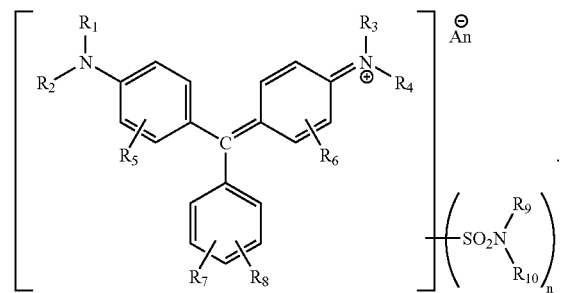

5 Claims, No Drawings

CYAN TONER AND METHOD OF PRODUCING CYAN TONER

This application is a continuation of International Application No. PCT/JP2006/302907 filed on Feb. 14, 2006, which claims the benefit of Japanese Patent Application No. 2005-037049 filed on Feb. 15, 2005.

BACKGROUND OF THE INVENTION

1. Field of the Invention

The present invention relates to a cyan toner used in full-color copiers and printers to develop electrostatic images in electrophotography, electrostatic recording, electrostatic printing and the like, and a method of producing the cyan toner.

2. Related Background Art

Electrostatic printing, electrophotography and the like have been used as techniques to develop electrostatic latent images with a developer to form visible images. In these techniques, electrostatic latent images are formed on a photosensitive member, and developed with a toner to form toner images, which are then transferred to a transfer member such as paper, and heated, pressed, heated/pressed or exposed to solvent vapor, if it is necessary, to fix the images and thus produce duplicates. In the process, some of the toner is not transferred to the photosensitive member and cleaned off by any one of various cleaning methods to repeat the above process. In order to produce multicolor images, original color images are separated by color using color filters of B (blue), G (green) and R (red). Subsequently, the latent images composed of dots from 20 to 70 μm in size, which corresponds to the original images, are developed by color toners of Y (yellow), M (magenta), C (cyan) and B (black) which make subtractive color effects.

Recently, these image-forming devices have been used as office copiers as well as in the fields of printers as output devices for computers and personal copiers for individuals. In addition to such fields represented by printers, plain-paper fax machines with a basic image-forming engine incorporated therein have been developed to a great extent. Such trend has required strictly image-forming machines to be more compact, lighter, faster, more reliable and higher in image quality, and at the same time those machines have been simplified with respect to components in their various aspects. As a result, toners have been also required strongly to have a higher performance.

Especially, in full-color printers for personal computers and full-color copiers, such image-forming systems and toners have been sought as are well compatible with sRGB, which is the standard color space in this application field, and reproducible for a wider range of color, since a larger number of images from the Internet or personal computer displays have been outputted.

As a consequence, a colorant has been sought which is more transparent and more chromatic than C. I. Pigment Blue 15:3, a conventional colorant used for a cyan toner. Furthermore, a colorant used for a cyan toner has been required to be more reproducible in the blue color range as well as in the color ranges of cyan and green.

In order to accomplish these subjects, it has been proposed to use, as colorant, anthraquinone dyes/pigments (see Japanese Patent Application Laid-Open No. H07-043948), and zinc phthalocyanines (see Japanese Patent Application Laid-Open No. 2003-302792), triphenylmethane dyes/pigments (see Japanese Patent Application Laid-Open No. H02-073260) and indophenol dyes (see Japanese Patent Application Laid-Open Publication No. H06-027949). However, anthraquinone dyes, for instance, absorb light in a wavelength range from 400 to 500 nm, and thus they are so low in brightness as to be poorly reproducible in the color ranges of cyan and blue, though they are highly transparency. In contrast, zinc phthalocyanines behave well in the color ranges of cyan and blue, but their transparency is not adequate.

SUMMARY OF THE INVENTION

It is an object of the present invention to provide a cyan toner which has accomplished the subjects as described above.

Thus, it is an object of the present invention to provide a cyan toner which is brighter and more greenish in hue than conventional cyan toners.

It is another object of the present invention to provide a cyan toner which is sharp in color and highly translucency.

As a result of extensive efforts to accomplish the objects described above, the present inventors have found that it is effective for the purpose to use a cyan toner and a method of producing the cyan toner that are described as follows:

(I) A cyan toner, comprising toner particles comprising at least a binder resin and a colorant, characterized in that the colorant is a coloring compound having a structure represented by the Formula (1):

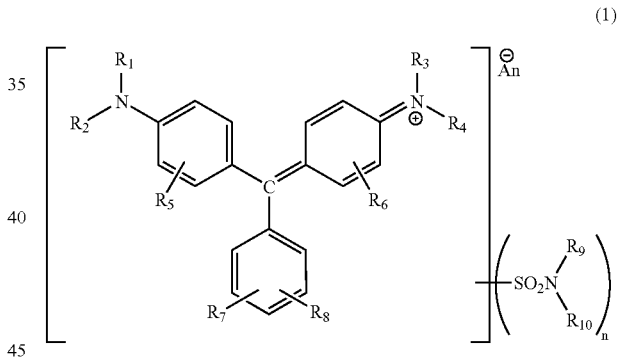

(1)

wherein $R_1$ to $R_4$ each independently represents a hydrogen atom, a substituted or unsubstituted alkyl group, a substituted or unsubstituted aryl group or a substituted or unsubstituted aralkyl group; $R_5$ and $R_6$ each independently represents a hydrogen atom or an alkyl group; $R_7$ and $R_8$ each independently represents a hydrogen atom, a sulfonic acid group, a substituted or unsubstituted amino group or $-SO_2NR_9R_{10}$; $R_9$ and $R_{10}$ each independently represents a hydrogen atom, an alkyl group, an aryl group or an aralkyl group, provided that $R_9$ and $R_{10}$ may form a heterocycle together with the nitrogen atom; and n represents an integer of 1 to 3, and wherein if either $R_7$ or $R_8$ is not $-SO_2NR_9R_{10}$, at least one of $R_1$ to $R_4$ is an $-SO_2NR_9R_{10}$ substituted alkyl, aryl or aralkyl group, and An represents a counter anion, provided that if the counter anion is present in the molecule, An is absent.

(II) The cyan toner according to (I), characterized in that the coloring compound has a structure represented by the Formula (2):

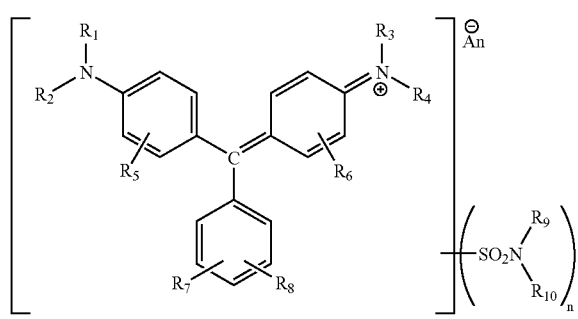

wherein $R_9$ and $R_{10}$ each independently represents a hydrogen atom, an alkyl group, an aryl group or an aralkyl group.

(III) The cyan toner according to (I) or (II), characterized in that the toner particles further comprises a phthalocyanine pigment.

(IV) The cyan toner according to (III), characterized in that the mass ratio of the coloring compound having a structure represented by the Formula (1) to the phthalocyanine pigment (the mass of the coloring compound having a structure represented by the Formula (1): the mass of the phthalocyanine pigment) is 1:99 to 70:30.

(V) The cyan toner according to (III) or (IV), characterized in that the phthalocyanine pigment is C. I. Pigment Blue 15:3.

(VI) The cyan toner according to any one of (I) to (V), characterized in that the cyan toner particles are polymer cyan toner particles produced by granulating a polymerizable monomer composition in an aqueous medium which comprises at least a polymerizable monomer, the coloring compound having a structure represented by the Formula (1) and a polymerization initiator, and polymerizing the polymerizable monomer.

(VII) A method of producing a cyan toner comprising cyan toner particles, wherein the cyan toner particles are polymer cyan toner particles produced by: mixing at least a polymerizable monomer, a coloring compound having a structure represented by the Formula (1):

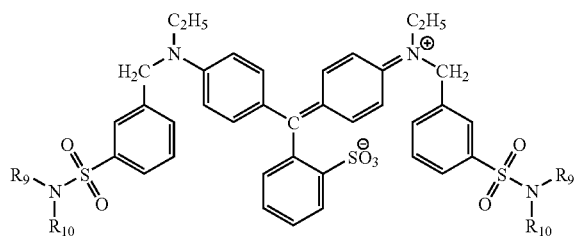

wherein $R_1$ to $R_4$ each independently represents a hydrogen atom, a substituted or unsubstituted alkyl group, a substituted or unsubstituted aryl group or a substituted or unsubstituted aralkyl group; $R_5$ and $R_6$ each independently represents a hydrogen atom or an alkyl group; $R_7$ and $R_8$ each independently represents a hydrogen atom, a sulfonic acid group, a substituted or unsubstituted amino group or $—SO_2NR_9R_{10}$; $R_9$ and $R_{10}$ each independently represents a hydrogen atom, an alkyl group, an aryl group or an aralkyl group, provided that $R_9$ and $R_{10}$ may form a heterocycle together with the nitrogen atom; and n represents an integer of 1 to 3, and wherein if either $R_7$ or $R_8$ is not $—SO_2NR_9R_{10}$, at least one of $R_1$ to $R_4$ is an $—SO_2NR_9R_{10}$ substituted alkyl, aryl or aralkyl group, and An represents a counter anion, provided that if the counter anion is present in the molecule, An is absent, and a polymerization initiator to prepare a polymerizable monomer composition;

dispersing the polymerizable monomer composition into an aqueous medium to form particles of the polymerizable monomer composition; and polymerizing the polymerizable monomer contained in the particles of the polymerizable monomer composition in the aqueous medium.

(VIII) The method of producing the cyan toner according to (VII), wherein the cyan toner is a cyan toner according to any one of (I) to (V).

The present invention can provide a cyan toner which is highly reproducible in the color ranges of cyan and green and highly translucency.

DESCRIPTION OF THE PREFERRED EMBODIMENTS

The present invention will be described in further detail by means of preferable embodiments.

The method of producing the inventive toner includes the following. In the first method, a binder resin, a wax, a colorant such as a pigment or dye, and optional additives such as a charge control agent are mixed well in a mixer, such as a HENSCHEL MIXER or a ball mill. The resultant mixture is melted and kneaded in a thermal kneader, such as a hot roll, kneader or extruder. The kneaded mass is cooled and solidified, and then pulverized and classified to obtain toner particles (hereinafter, also referred to as pulverization). Other methods include a process of spraying the kneaded melt in air through a disk type or multi-fluid nozzle to produce a spherical toner, and suspension polymerization. Still other methods include dispersion polymerization where the aqueous medium contains an organic solvent able to dissolve the monomer, but not the resultant polymer to directly form a toner, and emulsion polymerization, as represented by soap-free polymerization where the monomer is polymerized in the presence of a polymerization initiator which is water-soluble and polar to directly form a toner.

The method of producing the inventive toner is preferably suspension polymerization. In addition, seed polymerization is also suitable where the monomer is used again to adsorb itself onto the once-produced polymer particles and polymerized with a polymerization initiator.

Now, suspension polymerization will be described to produce the cyan toner according to the present invention. It is preferable to first prepare a polymerizable monomer composition by mixing at least a polymerizable monomer, a coloring compound having a structure represented by the Formula (1) and a polymerization initiator, then disperse the polymerizable monomer composition into an aqueous medium to form the particles of the polymerizable monomer composition, and polymerize the polymerizable monomer contained in the particles of the polymerizable monomer composition in the aqueous medium to produce cyan toner particles.

More specifically, the method of producing the toner particles will be described. The polymerizable monomer composition is prepared by homogeneously dispersing or dissolving at least a polymerizable monomer, a coloring compound, a polymerization initiator, and optional additives (a charge control agent and a release agent). The polymerizable monomer composition is then dispersed into an aqueous medium containing a dispersion stabilizer by a homogenizer, etc. The aqueous medium is stirred under the conditions of speed and length of time controlled so that the resultant monomer droplets have preferably a desired size of the toner particles, generally a particle size of 30 μm or less. Thereafter, the particles of the polymerizable monomer system will be kept stably by the action of the dispersion stabilizer so as to have a specific shape and surface properties as particle, and polymerized stably without coagulation or coalescence of the particles associated with the progress of polymerization by stirring them at such a speed that the particles of the polymerizable monomer composition will be prevented from precipitation. The polymerization is carried out by setting the temperature at 40° C. or more, typically at 50 to 90° C. The temperature may be raised in the late stage of the polymerization. In the late stage of and at the end of the reaction, a part of the aqueous medium may be also evaporated off in order to remove the remaining polymerizable monomer, byproducts, etc. which may give off or be related to unpleasant odors on fixation of the toner. After the completion of the reaction, the resultant toner particles are freed from the dispersion stabilizer, washed well with water, recovered by filtration, dried, and optionally classified to obtain the cyan toner particles.

A polymerizable monomer, a colorant, a charge control agent, a release agent, a polymerization initiator and other additives, which constitute the polymerizable monomer composition used in the present invention, include those described below.

The polymerizable monomer used in the present invention includes the following: styrenic monomers such as styrene, o-methylstyrene, m-methylstyrene, p-methylstyrene, p-methoxystyrene and p-ethylstyrene; acrylate esters such as methyl acrylate, ethyl acrylate, n-butyl acrylate, isobutyl acrylate, n-propyl acrylate, n-octyl acrylate, dodecyl acrylate, 2-ethylhexyl acrylate, stearyl acrylate, 2-chloroethyl acrylate and phenyl acrylate; methacrylate esters such as methyl methacrylate, ethyl methacrylate, n-propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate and diethylaminoethyl methacrylate; and others such as acrylonitrile, methacrylonitrile and acrylamide.

The polymerizable monomer may be used alone or in combination. Among the above polymerizable monomers, styrene or a styrene derivative may be preferably used alone or in combination with another polymerizable monomer, taking account of the development and endurance properties of the toner.

The polymerizable monomer for the present invention may be also polymerized in the presence of a polymer or copolymer having polar groups.

The polar polymer and polar copolymer which can be used in the present invention include the following: those polar polymers and copolymers, i.e., unsaturated and saturated polyesters, from unsaturated carboxylic acids such as acrylic acid and methacrylic acid; or unsaturated dibasic acids or unsaturated dibasic acid anhydrides.

The polar polymer or polar copolymer may be used preferably in an amount of 1 part by mass or more and 35 parts by mass or less, and more preferably 5 parts by mass or more and 20 parts by mass or less, based on 100 parts by mass of the polymerizable monomer. If the polar polymer or polar copolymer is used in an amount more than 35 parts by mass, the resulting polymer may be so viscous as to make its granulation difficult.

The toner of the present invention contains at least a coloring compound as colorant, having a structure represented by the following Formula (1):

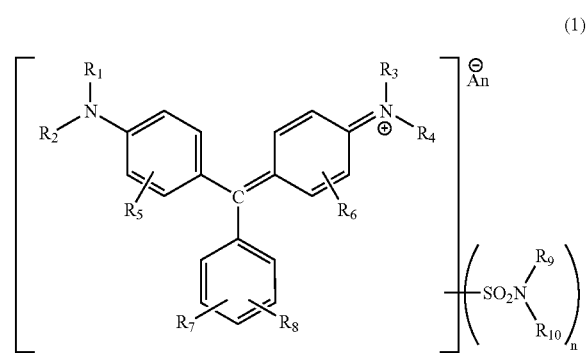

(1)

wherein $R_1$ to $R_4$ each independently represents a hydrogen atom, a substituted or unsubstituted alkyl group, a substituted or unsubstituted aryl group or a substituted or unsubstituted aralkyl group; $R_5$ and $R_6$ each independently represents a hydrogen atom or an alkyl group; $R_7$ and $R_8$ each independently represents a hydrogen atom, a sulfonic acid group, a substituted or unsubstituted amino group or $—SO_2NR_9R_{10}$; $R_9$ and $R_{10}$ each independently represents a hydrogen atom, an alkyl group, an aryl group or an aralkyl group, provided that $R_9$ and $R_{10}$ may form a heterocycle together with the nitrogen atom; and n represents an integer of 1 to 3, and wherein if either $R_7$ or $R_8$ is not $—SO_2NR_9R_{10}$, at least one of $R_1$ to $R_4$ is an $—SO_2NR_9R_{10}$ substituted alkyl, aryl or aralkyl group, and An represents a counter anion, provided that if the counter anion is present in the molecule, An is absent.

The coloring compound having a structure represented by the Formula (1) can be obtained, for example, by the following method.

First, a compound having a structure represented by the Formula (3):

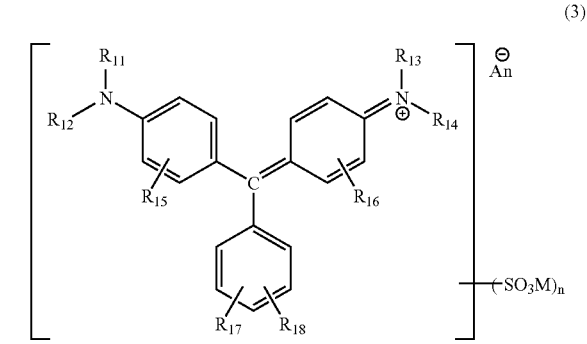

(3)

wherein $R_{11}$ to $R_{14}$ each independently represents a hydrogen atom, a substituted or unsubstituted alkyl group, a substituted or unsubstituted aryl group or a substituted or unsubstituted aralkyl group; $R_{15}$ and $R_{16}$ each independently represents a hydrogen atom or an alkyl group; $R_{17}$ and $R_{18}$ each independently represents a hydrogen atom, a sulfonic acid group, a substituted or unsubstituted amino group or —$SO_3M$; and n represents an integer of 1 to 3, and wherein if either $R_{17}$ or $R_{18}$ is not —$SO_3M$, at least one of $R_{11}$ to $R_{14}$ is an —$SO_3M$ substituted alkylene, arylene or aralkylene group, M represents a counter cation of a sulfonate group and An represents a counter anion, provided that if the counter anion is present in the molecule, An is absent, and a thionyl halide react in the presence of N,N-dimethylformamide and an organic solvent to produce a sulfonylhalide compound having a structure represented by the Formula (4):

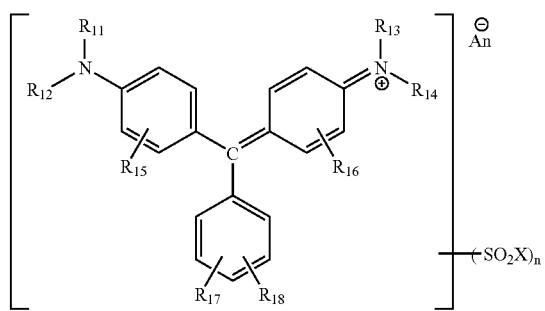

wherein $R_{11}$ to $R_{18}$ each independently represents a hydrogen atom, a substituted or unsubstituted alkyl group, a substituted or unsubstituted aryl group or a substituted or unsubstituted aralkyl group; $R_{15}$ and $R_{16}$ each independently represents a hydrogen atom or an alkyl group; $R_{17}$ and $R_{18}$ each independently represents a hydrogen atom, a sulfonic acid group, a substituted or unsubstituted amino group or —$SO_3X$; and n represents an integer of 1 to 3, and wherein if either $R_{17}$ or $R_{18}$ is not —$SO_3X$, at least one of $R_{11}$ to $R_{14}$ is an —$SO_3X$ substituted alkylene, arylene or aralkylene group, X represents a halogen atom and An represents a counter anion, provided that if the counter anion is present in the molecule, An is absent. Then, the sulfonylhalide compound having a structure represented by the Formula (4) can be condensed with an amine having a structure represented by the Formula (5):

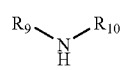

wherein $R_9$ and $R_{10}$ each independently represents a hydrogen atom, an alkyl group, an aryl group or an aralkyl group, to obtain the coloring compound having a structure represented by the Formula (1).

In the Formula (1), the alkyl group represented by $R_1$ to $R_4$ includes a methyl group, an ethyl group, an n-propyl group, an isopropyl group, an n-butyl group, a sec-butyl group, a tert-butyl group, an n-pentyl group and an n-hexyl group. The aryl group represented by $R_1$ to $R_4$ includes a phenyl group, 1-naphthyl group and 2-naphthyl group. The aralkyl group represented by $R_1$ to $R_4$ includes a benzyl group and a phenethyl group. $R_1$ and $R_3$ (or, $R_1$ and $R_4$), as well as $R_2$ and $R_4$ (or, $R_2$ and $R_3$) may be the same or different, but are preferably the same in view of color and/or material cost. It is particularly preferable if all of $R_1$ to $R_4$ represent an ethyl group, if $R_1$ and $R_3$ represent an ethyl group, and $R_2$ and $R_4$ represent a benzyl group, or if $R_1$ and $R_4$ represent an ethyl group, and $R_2$ and $R_3$ represent a benzyl group. This type of functional group may be substituted by —$SO_2NR_9R_{10}$. Here, —$SO_2NR_9R_{10}$ has the same $R_9$ and $R_{10}$ as in the Formula (1).

In the Formula (1), the alkyl group represented by $R_5$ and $R_6$ includes a methyl group, an ethyl group, an n-propyl group and an isopropyl group. Preferably, $R_5$ and $R_6$ represent a hydrogen atom or a methyl group.

In the Formula (1), the amino group represented by $R_7$ and $R_8$ may substituted by an alkyl group such as a methyl or ethyl group, a phenyl group, a methoxyphenyl group, an ethoxyphenyl group, a benzenesulfonic acid group or the like.

In the Formula (1), the alkyl group represented by $R_9$ and $R_{10}$ includes the following: a methyl group, an ethyl group, an n-propyl group, an isopropyl group, an n-butyl group, a sec-butyl group, a tert-butyl group, an n-pentyl group, an n-hexyl group, an n-heptyl group and an n-octyl group, as well as a linear or cyclic alkyl group such as a 2-ethylhexyl group and a cyclohexyl group. The aryl group represented by $R_9$ and $R_{10}$ includes a phenyl group, a 1-naphthyl group and a 2-naphthyl group. The aralkyl group represented by $R_9$ and $R_{10}$ includes a benzyl group and a phenethyl group. In addition, $R_9$ and $R_{10}$ may form a heterocycle together with the nitrogen atom, for example, such as a piperidino group, a piperazino group, a pyrrole group, an indole group, a carbazole group, a pyrazole group, an indazole group, an imidazole group, a benzimidazole group, a triazole group, a benztriazole group and a tetrazole group. It is preferable that $R_9$ and $R_{10}$ are highly lipophilic, like a longer-chain alkyl group, in view of compatibility with a binder resin.

The coloring compound having a structure represented by the Formula (1) is exemplified by, but not limited to, the following compounds.

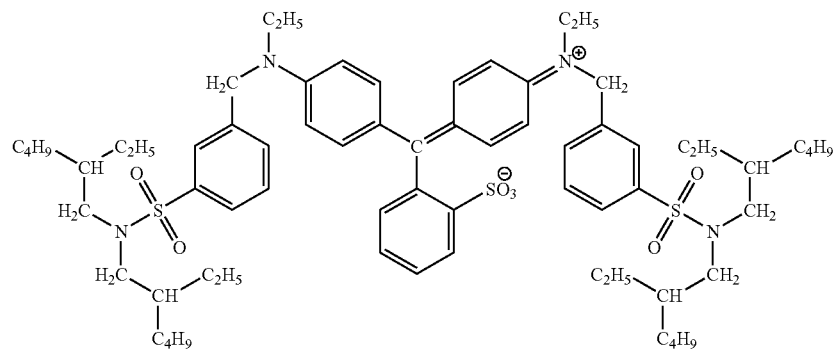

(6)

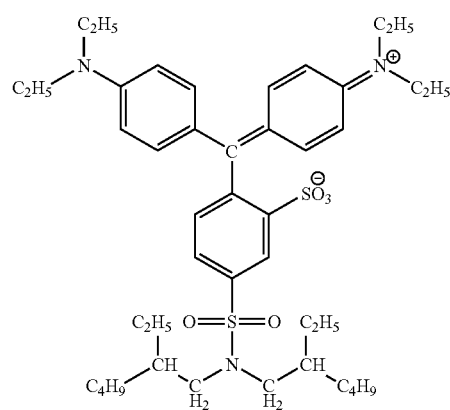

(7)

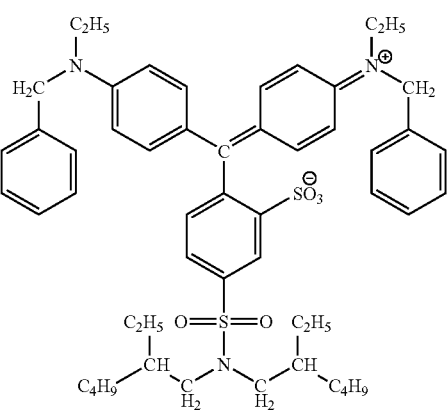

(8)

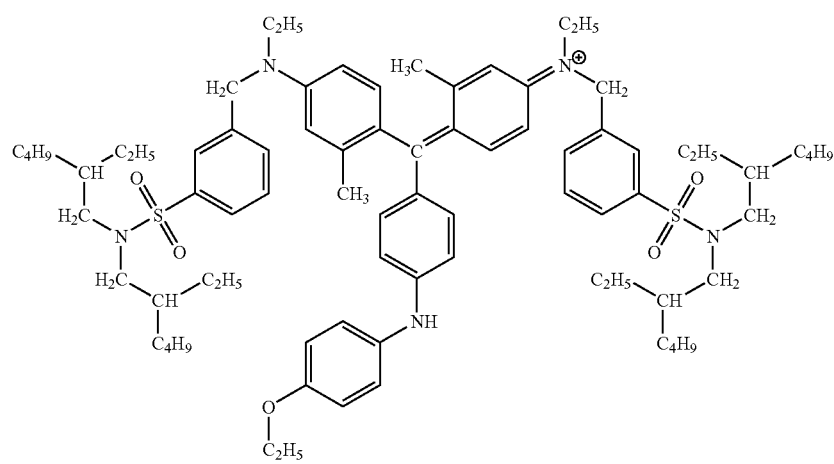

(9)

The coloring compound having a structure represented by the Formula (1) may be used preferably in an amount of 0.1 parts by mass or more and 20 parts by mass or less, and particularly preferably 0.5 parts by mass or more and 10 parts by mass or less, based on 100 parts by mass of the polymerizable monomer. If the coloring compound having a structure represented by the Formula (1) is used in an amount more than 20 parts by mass, the toner produced by a polymerization process, such as suspension polymerization, may not be granulated stably in polymerization and may have a broader particle size distribution. To make matters worse, the toner may have a lower charge stability and thus keep a desired charge level with difficulty. On the other hand, if the coloring compound having a structure represented by the Formula (1) is used in an amount less than 0.1 parts by mass, the toner may have a desired coloring power with difficulty and thus make quality images with a high image density with difficulty.

The coloring compound having a structure represented by the Formula (1) can be used alone or in combination as colorant. Blue-range colorants which can be combined with the coloring compound having a structure represented by the Formula (1) include the following: aluminum phthalocyanine, C. I. Pigment Blue 15:1, C. I. Pigment Blue 15:3, C. I. Pigment Blue 15:4, C. I. Pigment Blue 16, C. I. Pigment Blue 60, C. I. Pigment Green 7, C. I. Solvent Blue 14, C. I. Solvent Blue 25, C. I. Solvent Blue 35, C. I. Solvent Blue 36, C. I. Solvent Blue 58, C. I. Solvent Blue 59 and C. I. Solvent Blue 60.

Particularly preferable blue-range colorants which can be combined with the coloring compound having a structure represented by the Formula (1) include phthalocyanine pigments, more preferably C. I. Pigment Blue 15:3. C. I. Pigment Blue 15:3 is highly reproducible in the blue range, while the coloring compound having a structure represented by the Formula (1) is highly reproducible in the color ranges of cyan and green. Therefore, a combination of both colorants provides an excellent color reproducibility.

In the toner, the mass ratio of the coloring compound having a structure represented by the Formula (1) to a phthalocyanine pigment (the mass of the coloring compound having a structure represented by the Formula (1): the mass of the phthalocyanine pigment) is preferably 1:99 to 70:30, and more preferably 20:80 to 60:40.

The cyan toner according to the present invention may contain a charge control agent.

If the charge control agent is negative, then the negatively chargeable control agent includes: metal-containing salicylic acid compounds, metal-containing monoazo dye compounds, styrene-acrylic acid copolymer, imidazole derivative, styrene-methacrylic acid copolymer (N,N'-diarylurea derivatives thereof) and calixarenes.

If the charge control agent is positive, then the positively chargeable control agent includes: modified products of nigrosine, fatty acid metal salts, etc.; guanidine compounds; imidazole compounds; quatenary ammonium salts such as tributylbenzylammonium 1-hydroxy-4-naphthosulfonate and tetrabutylammonium tetrafluoroborate, and their analogs, i.e., onium salts such as phosphonium salts, etc and lake pigments thereof; triphenylmethane dyes and lake pigments thereof (the laking agent includes phosphotungstic acid, phosphomolibdic acid, phosphotungstomolibdic acid, tannic acid, lauric acid, gallic acid, ferricyanates and ferrocyanates); metal salts of higher fatty acids; diorganotin oxides such as dibutyltin oxide, dioctyltin oxide and dicyclohexyltin oxide; and diorganotin borates such as dibutyltin borate, dioctyltin borate and dicyclohexyltin borate. These may be used alone or as a combination of two or more.

It is desirable that the charge control agent should be colorless or provide no color effect on the colorant used in the present invention.

The charge control agent may be used preferably in an amount of 0.01 parts by mass or more and 20 parts by mass or less, and more preferably 0.5 parts by mass or more and 10 parts by mass or less, based on 100 parts by mass of the resin component.

The cyan toner according to the present invention may contain a release agent.

The release agent used in the present invention is preferably a hydrocarbon wax. Specifically, it includes paraffinic and olefinic waxes and modified products thereof, which are, for example, oxidized or grafted products as well as higher fatty acids, their metal salts, their amide waxes and the likes.

A particularly preferable release agent includes nonpolar waxes such as paraffin wax. When a nonpolar wax is used, the wax is localized in the center of the toner particles, while localization of polar groups on the surface of the toner particles is facilitated. The release agent may be used in an amount of 5% by mass or more and 30% by mass or less, based on the toner. If the release agent is used at a level less than 5% by mass, localization of polar groups on the surface of the toner particles is facilitated to a lesser extent. If the release agent is used at a level more than 30% by mass, the localization is facilitated, but the toner is lower in antiblocking property.

The polymerization initiator used in the present invention includes the following: azo or diazo polymerization initiators, such as 2,2'-azobis(2,4-dimethylvaleronitrile), 2,2'-azobisisobutyronitrile, 1,1'-azobis(cyclohexane-1-carbonitrile), and 2,2'-azobis(4-methoxy-2,4-dimethylvaleronitrile); peroxide polymerization initiators, such as benzoyl peroxide, methyl ethyl ketone peroxide, diisopropyl peroxycarbonate, cumene hydroperoxide, tert-butyl hydroperoxide, di-tert-butyl peroxide, dicumyl peroxide, 2,4-dichlorobenzoyl peroxide, lauroyl peroxide, 2,2-bis(4,4-tert-butylperoxycyclohexyl)propane and tris(tert-butylperoxy)triazine; polymeric initiators with peroxides on the side chains; persulfates such as potassium persulfate and ammonium persulfate; and hydrogen peroxide.

The polymerization initiator may be preferably used in an amount of 0.5 parts by mass or more and 20 parts by mass or less, based on 100 parts by mass of the polymerizable monomer, either alone or in combination.

In the present invention, in order to control the molecular weight of the toner resin to be prepared, a known crosslinking and/or chain transfer agent may be used, preferably in an amount of 0.001 parts by mass or more and 15 parts by mass or less, based on 100 parts by mass of the polymerizable monomer.

A preferable crosslinking agent includes the following: divinyl aromatic compounds, such as divinylbenzene, divinylnaphthalene and derivatives thereof; and in addition, diethylenic carboxylic acid esters, such as ethylene glycol dimethacrylate, diethylene glycol methacrylate, triethylene glycol methacrylate, trimethylolpropane triacrylate, allyl methacrylate, tert-butylaminoethyl methacrylate, tetraethylene glycol dimethacrylate and 1,3-butanediol dimethacrylate; any divinyl compound, such as N,N-divinylaniline, divinyl ether, divinyl sulfide or divinyl sulfone; and compounds having two or more vinyl groups. The crosslinking agent may be used alone or in a combined form.

The dispersion stabilizer which can be used in the present invention includes the following: inorganic compounds, such as calcium phosphate, hydroxyapatite, magnesium phosphate, aluminum phosphate, zinc phosphate, calcium carbonate, magnesium carbonate, calcium hydroxide, magnesium hydroxide, aluminum hydroxide, calcium metasilicate, calcium sulfate, barium sulfate, bentonite, silica and alumina; and organic compounds, such as polyvinyl alcohol, gelatin, methyl cellulose, methylhydroxypropyl cellulose, ethyl cellulose, sodium carboxymethyl cellulose, polyacrylic acid and its salts, and starch. The dispersion stabilizer may be dispersed in an aqueous medium in its use.

The dispersion stabilizer can prevent agglomeration of droplets which are dispersed evenly in an aqueous medium and comprise the particles of the polymerizable monomer composition, and may be uniformly adsorbed to the droplet surface to stabilize the droplets. After the polymerizable monomer within the droplets is polymerized, the dispersion stabilizer may be dissolved by treatment with an acid or alkali, washing with hot water or something else to remove it from the resultant toner particles.

A family of calcium phosphates as dispersion stabilizer can be easily removed from the surface of the toner particles simply by acid treatment and water washing. Under these conditions, the colorant, the pigment dispersing agent, the charge control agent, etc. are not either decomposed or dissolved and it is not necessary to take possible heat deformation of the toner particles into consideration. Therefore, such a calcium phosphate can be applied effectively as dispersion stabilizer.

The family of calcium phosphates described here includes calcium phosphate, calcium hydrogen phosphate, calcium dihydrogen phosphate, hydroxyapatite and the like as well as mixtures thereof. Among these calcium phosphates, hydroxyapatite and calcium phosphate are preferable, and hydroxyapatite is most preferable, in view of the effects of crystal size, particle size of crystal agglomerates, solubility in an acid, etc.

Such a calcium phosphate is most effective as a dispersing agent when it is produced in an aqueous medium from an aqueous phosphate solution and an aqueous calcium solution, since this method involves no agglomeration and provides uniform and fine crystal grains. If a powdery calcium phosphate is used as it is, component particles of the powder are likely to agglomerate strongly with each other, and the resultant agglomerates are nonuniform in particle size and rather difficult to disperse in an aqueous phase. Another benefit of the method of producing a calcium phosphate is that water-soluble neutral salts co-produced together with the calcium phosphate have both effects of preventing dissolution of the polymerizable monomer into the water and of increasing the specific gravity of the aqueous medium.

An external additive for the toner, which can be used in the present invention, includes the following: oxides such as alumina, titanium oxide, silica, zirconium oxide and magnesium oxide; and also silicon carbide, silicon nitride, boron nitride, aluminum nitride, magnesium carbonate and organosilicon compounds.

Additionally, it is convenient to treat the above fine powder hydrophobically, since it may lower an environmental dependency of the charge level of the toner on temperature, humidity, etc., and prevent detachment of the powder off the surface of the toner. An agent for such hydrophobic treatment includes, e.g., coupling agents, such as silane coupling agents, titanium coupling agents and aluminum coupling agents; and oils, such as silicone oils, fluorine oils and various modified oils.

Among the known external additives, silica, alumina, titania, or a complex oxide thereof or the like is a preferable choice since it provides improvements in charge stability, developability, flowability and storage of the toner particles. Silica, in particular, is more preferable since it can control arbitrarily the coalescence of primary particles to some extent depending on the type of starting materials and oxidation conditions such as temperature. Examples of such a silica includes so-called dry silica, which is produced by vapor-phase oxidation of a silicon halide or alkoxide and also called dry-process or fumed silica, and so-called wet silica, which is produced from a silicon alkoxide, water glass or something else. However, dry silica is more preferable because it has a lower level of silanol groups both on the surface and in the inner portion of the fine silica particles and involves a smaller amount of residues when it is produced. In addition, a fine powder of the composite of silica and another metal oxide can be produced by using a metal halide compound, such as aluminum chloride or titanium chloride, together with a silicon halide compound in the production of dry silica, and such a composite powder is also included by silica.

The external additive may be added preferably in an amount of 0.1 parts by mass or more and 3 parts by mass or less, based on 100 parts by mass of the toner, taking account of the charge stability of the toner, the stability of its bulk density, its stability in a highly humid environment where it is left and others. A plurality of external agents may be also added in combination. Further, external agents preferably used in separate combinations will be described below.

Further addition of inorganic or organic near-spherical fine particles having a primary particle size of 50 nm or more (preferably having a specific surface area less than 50 $m^2/g$) also forms a preferable embodiment because they may improve the transferability and/or cleanability of the toner. Preferable examples of such particles include spherical silica particles, spherical polymethylsilsesquioxane particles and spherical resin particles.

The inventive toner may contain yet other additives in such levels that they make no substantially deleterious effect, for example, a lubricant powder such as polyfluoroethylene powder, zinc stearate powder or polyvinylidene fluoride powder; a polishing agent such as cerium oxide powder, silicon carbide powder or strontium titanate powder; an anticaking agent such as titanium oxide powder or aluminum oxide powder; a conductive agent such as carbon black powder, zinc oxide powder or tin oxide powder; and a development improving agent such as a little amount of organic or inorganic fine particles with the opposite polarity.

The toner produced according to the present invention may be typically used in both one-component and two-component developers. When the toner is used as one-component developer, for example, a procedure may be employed where the developing sleeve is forcibly charged tribologically with a blade and a fur brush to attach the toner onto the sleeve and carry the toner.

On the other hand, when the toner of the present invention is used in a two-component developer that is utilized more generally, a carrier is used together with the toner to form a developer. The carrier used in the present invention is not limited in particular, but takes predominantly a single or complex ferrite form composed of iron, copper, zinc, nickel, cobalt, manganese and/or chromium elements. The shape of the carrier is also important since its saturated magnetization and electrical resistance can be controlled in a wide range if the shape is suitable. The carrier may be designed, for example, in a spherical, flat, amorphous or some other shape. Furthermore, the microstructure of the carrier surface, such as surface irregularity, should be preferably controlled. The carrier can be generally produced first by sintering the above inorganic oxide and granulating it to make core particles thereof and then by coating the core particles with a resin. However, in order to reduce the load of the carrier on the toner, a low-density carrier of dispersed particles may be produced by mixing/kneading the inorganic oxide and the resin, and then pulverizing and classifying the resultant coated oxide, or a carrier of spherical dispersed particles may be produced by mixing/kneading the inorganic oxide directly with the monomer and subjecting the kneaded material to suspension polymerization in an aqueous medium, or some other possible processes may be employed to produce the toner.

In the present invention, the above system of a carrier with a resin or the like coated on its surface is particularly preferable. The system can be made by any one of the conventional processes which include a process of coating a carrier with a coating material, such as a resin, dissolved or suspended in a solvent to adhere it onto the carrier and a process of simply mixing a carrier with a coating material as it is.

Such a coating material for attaching itself to the carrier surface may depend on the type of the toner material, but includes, for example, polytetrafluoroethylene, monochlorotrifluoroethylene polymer, polyvinylidene fluoride, silicone resin, polyester resins, di-tert-butylsalicylic acid metal compounds, styrenic resins, acrylic resins, polyamides, polyvinylbutyral, nigrosine, aminoacrylate resins, basic dyes and lakes thereof, fine silica powder and fine alumina powder. These materials may be used alone or in combination, but are not always exclusive choices as the coating material.

The coating compound may be generally loaded on the carrier in a total amount of 0.1 parts by mass or more and 30 parts by mass or less, and preferably 0.5 parts by mass or more and 20 parts by mass or less, based on 100 parts by mass of the carrier.

The carrier may preferably have an average particle size of 10 µm or more and 100 µm or less, more preferably 20 µm or more and 50 µm or less.

In a particularly preferable aspect, the carrier may be a coated ferrite carrier having a ternary Cu—Zn—Fe ferrite with a combination of resins coated on its surface, wherein the combination includes a mixture of a fluororesin and a styrenic resin, such as polyvinylidene fluoride and a styrene-methyl methacrylate resin; polytetrafluoroethylene and a styrene-methyl methacrylate resin; or a fluoro-copolymer and a styrenic copolymer, in a ratio of 90:10 to 20:80, preferably 70:30 to 30:70, and it is coated in an amount of 0.01% by mass or more and 5% by mass or less, and preferably 0.1% by mass or more and 1% by mass or less, and wherein the carrier has an average particle size described above while carrier particles passing through 250 mesh and staying on 400 mesh accounts for 70% by mass or more. An example of the fluoro-copolymer is a vinylidene fluoride-tetrafluoroethylene copolymer (10:90 to 90:10), and the styrenic copolymer includes styrene-2-ethylhexyl acrylate (20:80 to 80:20), and styrene-2-ethylhexyl acrylate-methyl methacrylate (20 to 60:5 to 30:10 to 50).

The coated ferrite carrier has a sharp particle size distribution and is effective to provide a preferable tribological charge property and also an improved electrophotographic property for the inventive toner.

When a two-component developer is prepared by mixing a carrier and the toner of the present invention, the developer may contain the toner at a level of 2% by mass or more and 15% by mass or less, and preferably 4% by mass or more and 13% by mass or less, to yield a good result in general. If the toner level is less than 2% by mass, the image density will be too low for practical use, and if it is more than 15% by mass, image fogging as well as toner scattering in the machine will increase, resulting in a shorter service life of the developer.

In addition, the carrier should have magnetic properties as follows. It is necessary for the carrier to have a magnetization intensity of 30 emu/cm$^3$ or more and 300 emu/cm$^3$ or less, at 79.58 kA/m (1,000 oersted) when it is saturated magnetically. To make image quality higher, it is more preferable to have the magnetization intensity of 100 emu/cm$^3$ or more and 250 emu/cm$^3$ or less. If the above magnetization intensity of the carrier is more than 300 emu/cm$^3$, a quality toner image will be more difficult to form, and if it is less than 30 emu/cm$^3$, more carrier adhesion will occur due to a lower magnetic binding force thereof.

In the present invention, the toner particles will be measured for particle size distribution as described below.

It is measured with a COULTER COUNTER, MULTI-SIZR III (manufactured by Coulter Corporation). An electrolyte solution used here is an aqueous solution of about 1% NaCl which is prepared from a reagent-grade sodium chloride. Such an electrolyte solution includes, e.g., ISOTON R-II (from Coulter, Japan Scientific Instruments Co., Ltd.). For the measurement, a sample solution is prepared by adding 0.1 to 5 ml of a surface-active agent (preferably, an alkylbenzene sulfonate) into 100 to 150 ml of the aqueous electrolyte solution and further adding 2 to 20 mg of a test sample. The resultant electrolyte solution having the sample suspended is dispersed in an ultrasonic disperser in about 1 to 3 minutes, and measured for volume and number of the toner particles in every channel using the above measuring device with the aperture set at 100 µm to calculate the volume and number distributions of the toner particles. Finally, the weight-average particle size (D4) of the toner is drawn from the volume distribution of the toner particles on the weight basis.

The channels used here consist of 13 channels having respective sizes of 2.00 to 2.52 µm; 2.52 to 3.17 µm; 3.17 to 4.00 µm; 4.00 to 5.04 µm; 5.04 to 6.35 µm; 6.35 to 8.00 µm; 8.00 to 10.08 µm; 10.08 to –12.70 µm; 12.70 to 16.00 µm; 16.00 to 20.20 µm; 20.20 to 25.40 µm; 25.40 to 32.00 µm; and 32.00 to 40.30 µm.

The images obtained in the examples described later will be evaluated according to the following procedures.

(1) Image Quality

A cyan toner was prepared by external addition of 0.5 parts of a fine silica powder subjected to hydrophobic treatment to 100 parts of toner particles produced by polymerization. A developer was prepared by mixing 5 parts of the toner with 95 parts of a ferrite carrier coated with an acrylic.

The altered version of a full-color copier, CLC-500 manufactured by Canon Inc. is used with the above developer to form images under the atmosphere of 22° C./66% (at the ambient temperature/ambient humidity), and the images are evaluated visually.

AA: very good

A: good

B: somewhat poor

C: poor

The altered version of CLC-500 has a distance of 400 µm between the developing unit and the photosensitive drum and a circumferential velocity ratio 1.3:1 of the developing sleeve to the photosensitive member drum. In the developing unit, 1,000 oersted of magnetic field strength at the developing pole, and 2,000 Vpp of alternate electric field with a frequency of 3,000 Hz are generated. The distance between the developing sleeve and the photosensitive drum was set at 500 µm.

(2) Transparency

Solid images were contact printed on OHP sheets in the OHP mode, and projected by a projector to observe the transparency of the solid images.

A: sufficiently clear

B: less clear

C: significantly dull (3) Measurement of Image Hue

Hues of toner images were measured quantitatively based on the definition by the L*a*b* color system standardized by International Commission on Illumination (CIE). Specifically, L* (color value), a* and b* (chromaticity representing hue and color saturation) were measured. They were measured using an instrument called GRETAG MACBETH SPECTROLIINO (manufactured by GretagMacbeth LLC) with a light source of D65 and a view angle set at 10°.

EXAMPLES

The present invention will be described in detail below with reference to the Examples and Comparative Examples, but is not limited to the Examples. The expression "part(s)"

described in any of the following Formulations will represent "part(s) by mass". In addition, Mw, Mw/Mn and m.p. described below will represent weight-average molecular weight, molecular weight distribution, and melting point, respectively.

Example 1

Preparation of an Aqueous Dispersion Medium 710 parts of Ion-exchange water was charged with 450 parts of an aqueous solution of 0.1M $Na_3PO_4$, heated to 60° C. and then stuffed at 12,000 rpm with a high-speed stirrer, TK-HOMOMIXER (manufactured by Tokushu Kika Kogyo). 68 parts of an aqueous solution of 1.0M $CaCl_2$ was then added to cause a reaction, which produced an aqueous dispersion medium containing fine particles of $Ca_3(PO_4)_2$.

| Preparation of a polymerizable monomer composition | |
|---|---|
| styrene monomer | 160 parts |
| n-butyl acrylate monomer | 40 parts |
| the coloring compound (6) | 2.0 parts |
| C.I. Pigment Blue 15:3 | 8.0 parts |
| styrene-methacrylic acid-methyl methacrylate copolymer (acid value: 70, Mw: 50,000, Mw/Mn = 2.0) | 15 parts |
| di-tert-butylsalicylic acid metal compound | 2 parts |
| paraffin wax (m.p. 70° C.) | 50 parts |

The Formulation shown above was heated to 60° C. and then stirred at 12,000 rpm with the TK-HOMOMIXER to make a solution or dispersion uniformly. parts of a polymerization initiator, 2,2'-azobis(2,4-dimethylvaleronitrile) was added thereto to prepare a solution of a polymerizable monomer composition.

The polymerizable monomer composition was added to the above described aqueous medium and stirred at 15,000 rpm at 60° C. under $N_2$ for 10 minutes with the TK-HOMOMIXER to produce granules of the polymerizable monomer composition. Thereafter, the mixture was heated to 70° C. and underwent a reaction for 10 hours while it was stuffed with a paddle-type stirring blade. After the polymerization was finished, the mixture was kept under reduced pressure to evaporate off the remaining monomers, cooled and charged with hydrochloric acid to dissolve the hydroxyapatite, filtered, washed with water, and dried to obtain the polymer product of toner particles.

The polymer toner particles had a weight-average particle size of 7.29 µm and a very sharp particle size distribution.

Example 2

Polymer toner particles were obtained in the same manner as in Example 1 except that the polymerizable monomer composition described in Example 1 was replaced by the following Formulation:

| | |
|---|---|
| styrene monomer | 160 parts |
| n-butyl acrylate monomer | 40 parts |
| the coloring compound (6) | 4.0 parts |
| C.I. Pigment Blue 15:3 | 4.0 parts |
| styrene-methacrylic acid-methyl methacrylate copolymer (acid value: 70, Mw: 50,000, Mw/Mn = 2.0) | 15 parts |
| di-tert-butylsalicylic acid metal compound | 2 parts |
| paraffin wax (m.p. 70° C.) | 50 parts. |

The polymer toner particles had a weight-average particle size of 7.48 µm and a very sharp particle size distribution.

Example 3

Polymer toner particles were obtained in the same manner as in Example 1 except that the polymerizable monomer composition described in Example 1 was replaced by the following Formulation:

| | |
|---|---|
| styrene monomer | 160 parts |
| n-butyl acrylate monomer | 40 parts |
| the coloring compound (6) | 4.5 parts |
| C.I. Pigment Blue 15:3 | 3.0 parts |
| styrene-methacrylic acid-methyl methacrylate copolymer (acid value: 70, Mw: 50,000, Mw/Mn = 2.0) | 15 parts |
| di-tert-butylsalicylic acid metal compound | 2 parts |
| paraffin wax (m.p. 70° C.) | 50 parts. |

The polmer toner particles had a weight-average particle size of 7.17 µm and a very sharp particle size distribution.

Example 4

Polymer toner particles were obtained in the same manner as in example 1 except that the compound (6) described in Example 1 was replaced by the following compound (10):

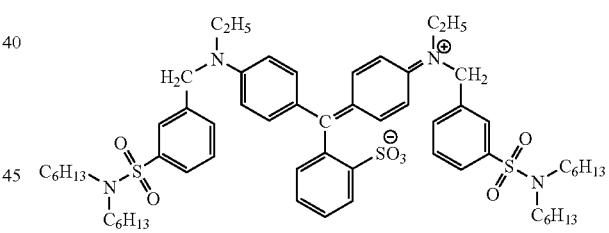

(10)

The polymer toner particles had a weight-average particle size of 7.20 µm and a very sharp particle size distribution.

Example 5

Polymer toner particles were obtained in the same manner as in Example 1 except that the compound (6) described in Example 1 was replaced by the compound (7). The polymer toner particles had a weight-average particle size of 6.79 µm and a very sharp particle size distribution.

Example 6

Polymer toner particles were obtained in the same manner as in Example 1 except that the compound (6) described in Example 1 was replaced by the compound (8). The polymer toner particles had a weight-average particle size of 7.33 µm and a very sharp particle size distribution.

Comparative Example 1

Polymer toner particles were obtained in the same manner as in Example 1 except that the polymerizable monomer composition described in Example 1 was replaced by the following Formulation:

| | |
|---|---|
| styrene monomer | 160 parts |
| n-butyl acrylate monomer | 40 parts |
| C.I. Pigment Blue 15:3 | 12 parts |
| styrene-methacrylic acid-methyl methacrylate copolymer (acid value: 70, Mw: 50,000, Mw/Mn = 2.0) | 15 parts |
| di-tert-butylsalicylic acid metal compound | 2 parts |
| paraffin wax (m.p. 70° C.) | 50 parts. |

The polymer toner particles had a weight-average particle size of 7.50 μm and a very sharp particle size distribution.

Comparative Example 2

It was attempted to produce a polymer toner in the same manner as in Example 1 except that the polymerizable monomer composition described in Example 1 was replaced by the following Formulation:

| | |
|---|---|
| styrene monomer | 160 parts |
| n-butyl acrylate monomer | 40 parts |
| C.I. Solvent Blue 14 (the compound (11) described below) | 2.0 parts |
| C.I. Pigment Blue 15:3 | 7 parts |
| styrene-methacrylic acid-methyl methacrylate copolymer (acid value: 70, Mw: 50,000, Mw/Mn = 2.0) | 15 parts |
| di-tert-butylsalicylic acid metal compound | 2 parts |
| paraffin wax (m.p. 70° C.) | 50 parts, | but polymer particles could not be obtained because coarse particles were produced due to coalescence thereof during granulation step.

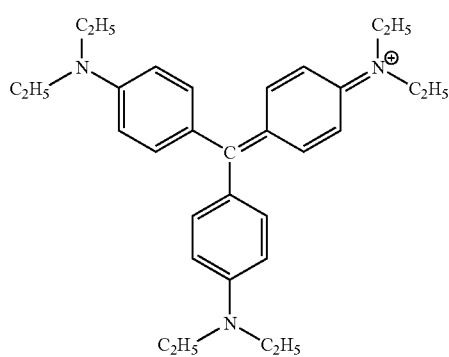

phosphotungstomolibdate

Comparative Example 3

Polymer toner particles were obtained in the same manner as in Example 1 except that the polymerizable monomer composition described in Example 1 was replaced by the following Formulation:

| | |
|---|---|
| styrene monomer | 160 parts |
| n-butyl acrylate monomer | 40 parts |
| C.I. Solvent Blue 35 (the compound (12) described below) | 2.0 parts |
| C.I. Pigment Blue 15:3 | 7 parts |
| styrene-methacrylic acid-methyl methacrylate copolymer (acid value: 70, Mw: 50,000, Mw/Mn = 2.0) | 15 parts |
| di-tert-butylsalicylic acid metal compound | 2 parts |
| paraffin wax (m.p. 70° C.) | 50 parts. |

The polymer toner particles had a weight-average particle size of 8.11 μm and a very sharp particle size distribution.

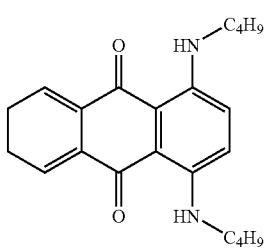

Comparative Example 4

Polymer toner particles were obtained in the same manner as in Example 1 except that the polymerizable monomer composition described in Example 1 was replaced by the following Formulation:

| | |
|---|---|
| styrene monomer | 160 parts |
| n-butyl acrylate monomer | 40 parts |
| C.I. Pigment Blue 16 | 12 parts |
| styrene-methacrylic acid-methyl methacrylate copolymer (acid value: 70, Mw: 50,000, Mw/Mn = 2.0) | 15 parts |
| di-tert-butylsalicylic acid metal compound | 2 parts |
| paraffin wax (m.p. 70° C.) | 50 parts. |

The polymer toner particles had a weight-average particle size of 6.59 μm and a very sharp particle size distribution.

Comparative Example 5

Polymer toner particles were obtained in the same manner as in Example 1 except that the polymerizable monomer composition described in Example 1 was replaced by the following Formulation:

| | |
|---|---|
| styrene monomer | 160 parts |
| n-butyl acrylate monomer | 40 parts |
| zinc phthalocyanine compound (the compound (13) described below) | 12 parts |
| styrene-methacrylic acid-methyl methacrylate copolymer (acid value: 70, Mw: 50,000, Mw/Mn = 2.0) | 15 parts |
| di-tert-butylsalicylic acid metal compound | 2 parts |
| paraffin wax (m.p. 70° C.) | 50 parts. |

The polymer toner particles had a weight-average particle size of 6.69 μm and a very sharp particle size distribution.

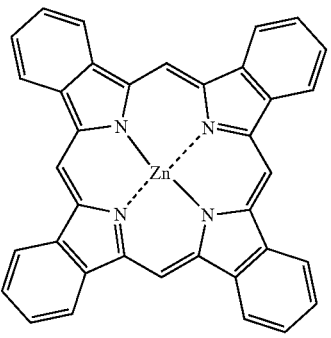

(13)

The particulate polymer toners produced in Examples 1 to 6, and Comparative Examples 1 and 3 to 5 were measured and evaluated for image quality, transparency and hue. The results are shown in Table 1.

TABLE 1

|  | Image quality | Transparency | Hue angle |
| --- | --- | --- | --- |
| Example 1 | AA | A | A |
| Example 2 | AA | A | A |
| Example 3 | AA | A | A |
| Example 4 | AA | A | A |
| Example 5 | A | A | A |
| Example 6 | A | A | A |
| Comparative Example 1 | B | A | C |
| Comparative Example 3 | B | A | C |
| Comparative Example 4 | A | B | C |
| Comparative Example 5 | A | B | A |

As clearly seen from the results in Table 1, the cyan toners containing the coloring compound (1) are more greenish in hue and more transparent than those containing conventional cyan colorants.

This application claims priority from Japanese Patent Application No. 2005-037049 filed on Feb. 15, 2005, which is hereby incorporated by reference herein.

What is claimed is:

1. A cyan toner, comprising toner particles comprising at least a binder resin and a colorant, wherein the colorant is a coloring compound having a structure represented by the Formula (2):

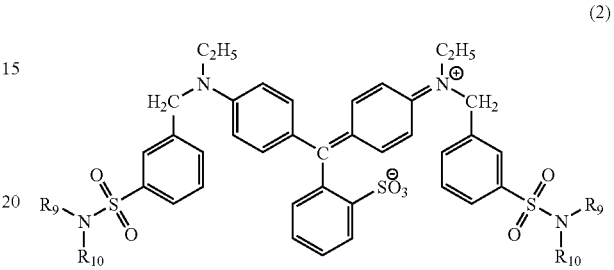

(2)

wherein $R_9$ and $R_{10}$ each independently represents a hydrogen atom, an alkyl group, an aryl group or an aralkyl group.

2. The cyan toner according to claim 1, wherein the toner particles further comprises a phthalocyanine pigment.

3. The cyan toner according to claim 2, wherein the mass ratio of the coloring compound having a structure represented by the Formula (2) to the phthalocyanine pigment (the mass of the coloring compound having a structure represented by the Formula (2): the mass of the phthalocyanine pigment) is 1:99 to 70:30.

4. The cyan toner according to claim 2, wherein the phthalocyanine pigment is C. I. Pigment Blue 15:3.

5. The cyan toner according to claim 1, wherein the cyan toner particles are polymer cyan toner particles produced by granulating a polymerizable monomer composition in an aqueous medium which comprises at least a polymerizable monomer, the coloring compound having a structure represented by the Formula (2) and a polymerization initiator, and polymerizing the polymerizable monomer.

* * * * *

UNITED STATES PATENT AND TRADEMARK OFFICE
CERTIFICATE OF CORRECTION

| | |
|---|---|
| PATENT NO. | : 7,264,910 B2 |
| APPLICATION NO. | : 11/433690 |
| DATED | : September 4, 2007 |
| INVENTOR(S) | : Takayuki Toyoda et al. |

Page 1 of 1

It is certified that error appears in the above-identified patent and that said Letters Patent is hereby corrected as shown below:

<u>COLUMN 17</u>:

Line 32, "parts" should read --5 parts--.

Signed and Sealed this

Twentieth Day of May, 2008

JON W. DUDAS
*Director of the United States Patent and Trademark Office*